United States Patent
Ooki (10) Patent No.: US 6,348,977 B1
(45) Date of Patent: *Feb. 19, 2002

(54) COLOR-CONTROLLED CONVERSION OF COLOR DATA

(75) Inventor: Jouji Ooki, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 161 days.

(21) Appl. No.: 08/831,648

(22) Filed: Apr. 9, 1997

(30) Foreign Application Priority Data

Apr. 9, 1996 (JP) .............................................. 8-086615

(51) Int. Cl.$^7$ ................................................ H04N 1/46
(52) U.S. Cl. .................... 358/1.9; 358/1.12; 358/1.14; 358/1.1; 358/501; 358/503; 358/518; 345/431

(58) Field of Search .................................. 395/109, 112, 395/114, 101; 358/518, 501, 503, 1.09, 1.12, 1.14, 1.01; 345/154, 431

(56) References Cited

U.S. PATENT DOCUMENTS

| | | | |
|---|---|---|---|
| 5,345,320 A | * 9/1994 | Hirota | 358/518 |
| 5,729,624 A | * 3/1998 | Tanioka et al. | 382/162 |
| 5,768,411 A | * 6/1998 | Shu et al. | 382/162 |
| 6,118,558 A | 9/2000 | Ohashi et al. | 358/518 |

* cited by examiner

*Primary Examiner*—Mark Zimmerman
*Assistant Examiner*—Lance W. Sealey
(74) *Attorney, Agent, or Firm*—Fitzpatrick, Cella, Harper & Scinto

(57) ABSTRACT

A color data processing apparatus in which a type of received data is discriminated and, based on a discriminated type of the received data, a first process is executed to convert the received data into Y (yellow), M (magenta), C (cyan) and K (black) data, or a second process is executed to convert the received data into K data.

43 Claims, 5 Drawing Sheets

COLOR-CONTROLLED CONVERSION OF COLOR DATA

BACKGROUND OF THE INVENTION

1. Field of the Invention

The present invention relates to color data processing by which a color printer prints color data using Y (Yellow), M (Magenta), C (Cyan), K (blacK) colors, and a control program and memory medium therefor.

2. Related Background Art

Figure 1:
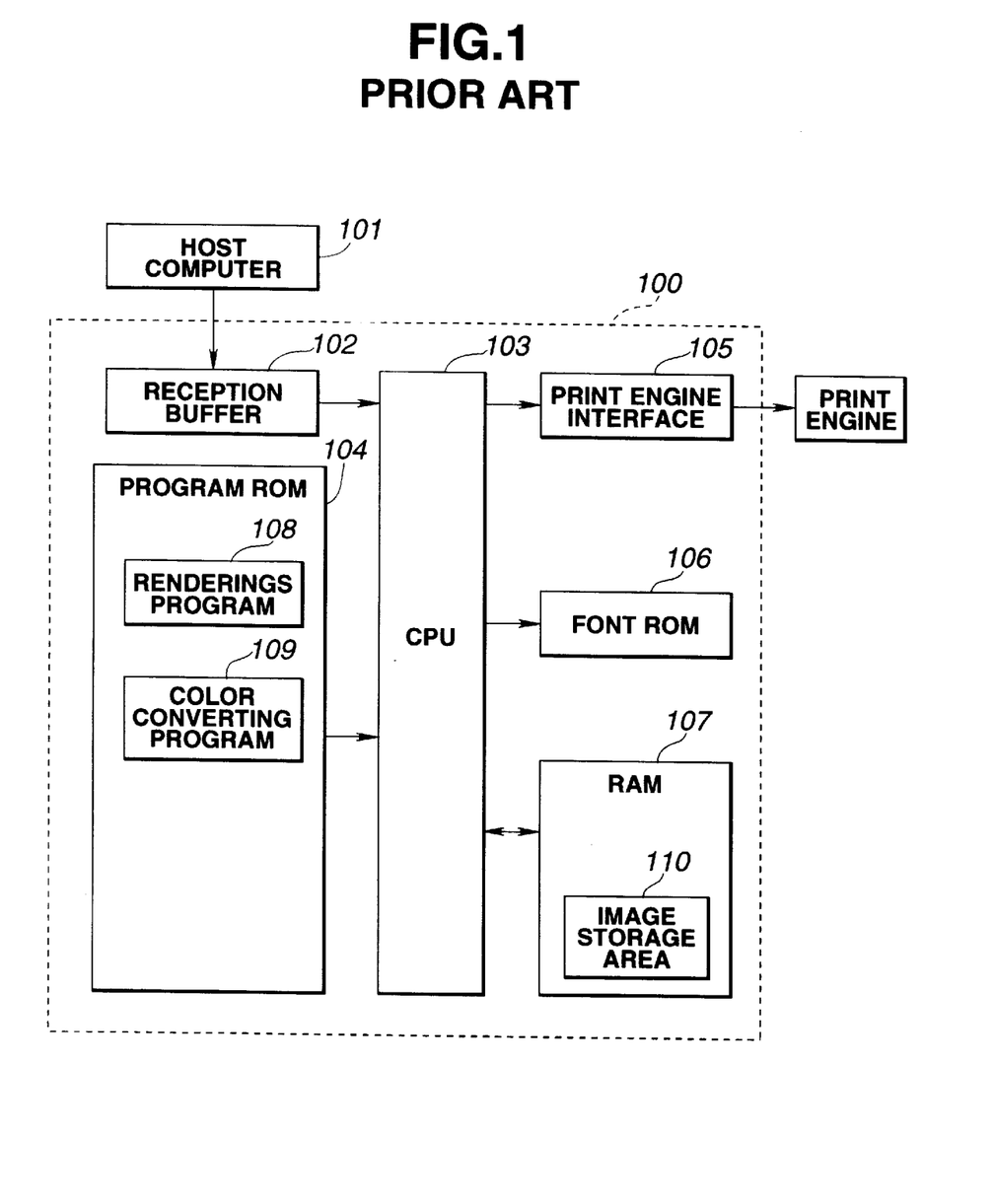
FIG. 1 is a block diagram showing a conventional arrangement of a system having a host computer and color printer.

FIG. 1 is a block diagram showing the arrangement of a system having a host computer and a color printer such as a color laser beam printer. Referring to FIG. 1, host computer 101 is connected to color laser beam printer control unit 100 (shown by broken line) in the color laser beam printer via an unnumbered connecter. Control unit 100 receives both commands (for example, a paper eject command) and data (for example, Red, Green and Blue data or black-and-white data) from host computer 101, and processes the commands and data so as to cause an unnumbered print engine to print via print engine interface 105.

CPU 103 controls the entire control unit 100. Reception buffer 102 temporarily stores received information including commands and data and so forth received from host computer 101. Program ROM 104 stores a control program shown by flow chart in FIG. 2, rendering program 108 (a rendering process in step S205 in FIG. 2) and color converting program 109 (a converting process in step S204 in FIG. 2). Font ROM 106 stores character fonts to make character images. RAM 101 is used as a work area to store converted YMCK data and so on while the program is operating and image storage area 110 to store an image. Print unit 105 outputs YMCK image to the color printer engine. Furthermore, a system power supply (not shown) supplies power to control unit 100.

An operation of color laser beam printer control unit 100 shown in FIG. 1 will be described with reference to the flow chart shown in FIG. 2.

Figure 2:
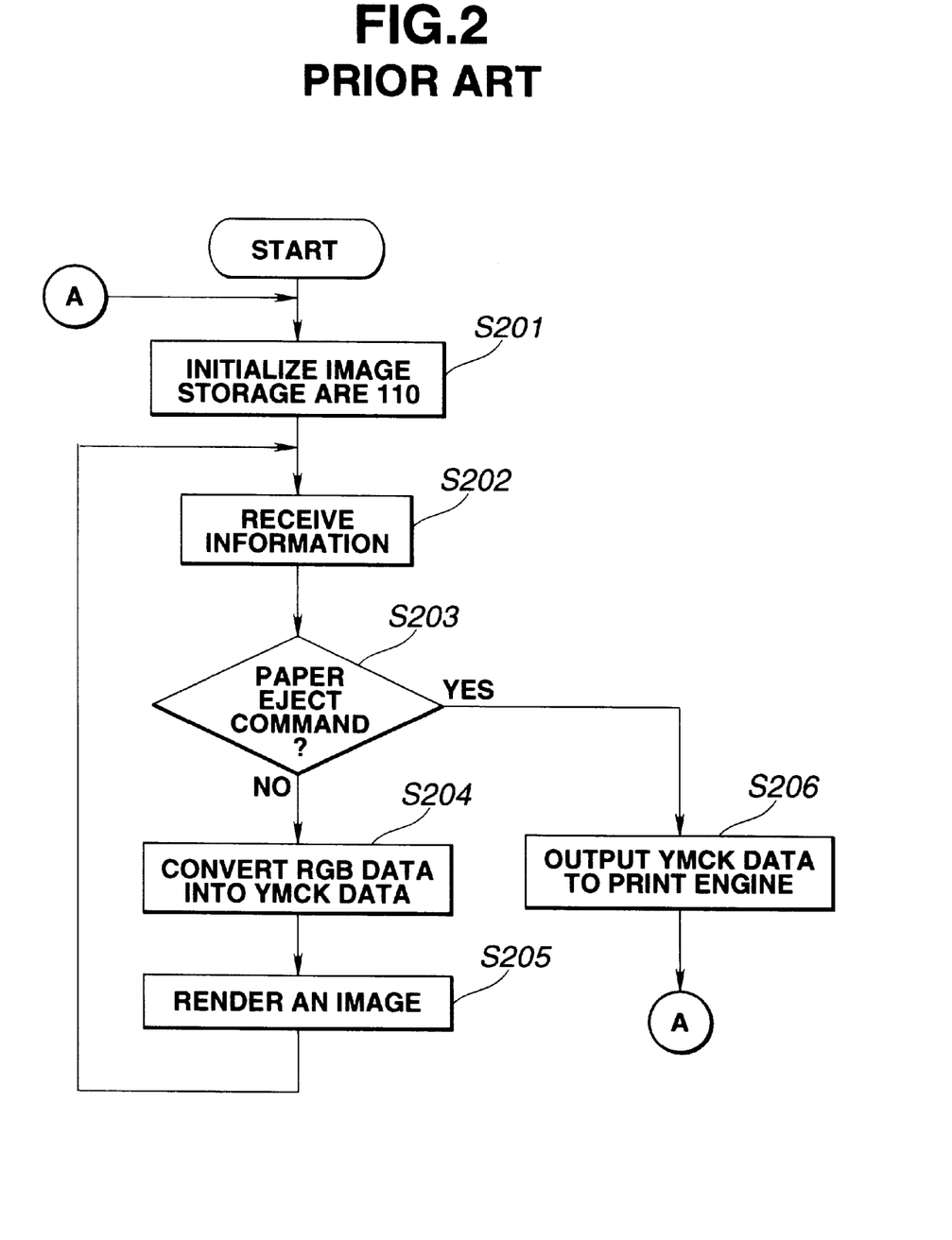
FIG. 2 is a flow chart showing the flow of color conversion processing (program) in a conventional system.

FIG. 2 is a conventional flow chart showing the flow of color convert processing in color laser beam printer control unit 100. The process steps shown in FIG. 2 are stored program process steps that are stored in a computer readable memory medium, in this case in program ROM 104.

In step S201, in response to initial applications of power, CPU 103 initializes image storage area 110. In step S202, CPU 103 reads received information in single unit codes from reception buffer 102, which stores commands and data received from host computer 101. In step S203, CPU 103 determines if the read information is a paper eject command. If it is determined in step S203 that the read information is not a paper eject command, or some other type of command, CPU 103 determines that the read information is data and converts the data into image data for use by the printer engine. Where the data is RGB color data, CPU 103 converts the RGB data into YMCK data as color space of the color printer engine using the color converting program 109 in step S204.

The color convert process to convert R (red), G (green), B (blue) data into YMCK data, is executed using the 4×3 matrix as follows.

$$\begin{bmatrix} Y \\ M \\ C \\ K \end{bmatrix} = [4 \times 3 \text{ matrix}] \begin{bmatrix} R \\ G \\ B \end{bmatrix}$$

Further, if it is determined that the read data is black-and-white data, the black-and-white data is converted into YMCK data by converting the black-and-white data into K data only and by setting the YMC data to 0 in step S204.

In step S205, CPU 103 renders an image based on YMCK data converted in step S204 using rendering program 108, stores the image by color in image storage ares 110 and flow returns to step S202 to receive new information.

On the other hand, if it is determined in step S203 that the information is a paper eject command, CPU 103 outputs the rendered YMCK image in image storage area 110 to print unit interface 105 to print the YMCK image. The color laser beam printer engine prints YMCK image using Y (Yellow), M (Magenta), C (Cyan) and K (blacK) color toner.

In the above case, even if host computer 101 sends RGB data for a pure gray color in which the RGB components are equal (Red=Green=Blue), the RGB data will be converted into YMCK data. Thus, the gray color is expressed by mixed YMCK data. This causes a sense of incongruity as compared to the case where black color is expressed by K (black) data only.

In addition, black-and-white data is converted into YMCK data by converting the black-and-white data into K (black) data only and by setting the Y,M,C data to 0 (zero) in step S204.

This causes a problem that size of the converted black-and-white data (intermediate data) becomes four times as large as needed since the Y, C and M components are zero. The converted black-and-white data is stored in work area in RAM 101. And then image is rendered based on the converted black-and-white data.

SUMMARY OF THE INVENTION

The present invention has been made in consideration of the above circumstances, and provides a color data processing apparatus, a method of controlling a process of converting color data, and/or a memory medium storing a controlling program, which discriminates the type of a received data, and which executes, based on the discriminated type of received data, a first process to convert the received data into Y (yellow), M (magenta), C (cyan) and K (black) color data, or an second process to convert the received data into K data.

In preferred embodiment of the invention, when the received data is color data for R (red), G (green) and B (blue) colors, and the color data for the R, G and B colors have equal or substantially equal values, the executing means executes the second process to convert the received data into K data, thereby rendering an image based on data converted by the second process.

Likewise, when the received data is color data for R, G and B colors, and the color data for the R, G and B colors do not have equal or substantially equal values, the executing means executes the first process to convert YMCK data, thereby rendering an image based on data converted by the first process.

It is also preferable, when the received data is black-and-white data, the executing means executes the second process to render an image based on data converted by the second process.

Likewise, when the received data is not black-and-white data, the executing means executes the first process to render an image based on data converted by the first process.

In particularly preferred embodiments, when the executing means renders an image based in data converted by the second process the executing means also sets values for Y, M and C data identically to 0.

Further objects, features and advantages of the present invention will become apparent from the following detailed description of the embodiments of the present invention with reference to the accompanying drawings.

DETAILED DESCRIPTION OF THE PREFERRED EMBODIMENTS

First and second illustrative embodiments of the present invention will be described with reference to the accompanying drawings.

First Embodiment

Figure 3:
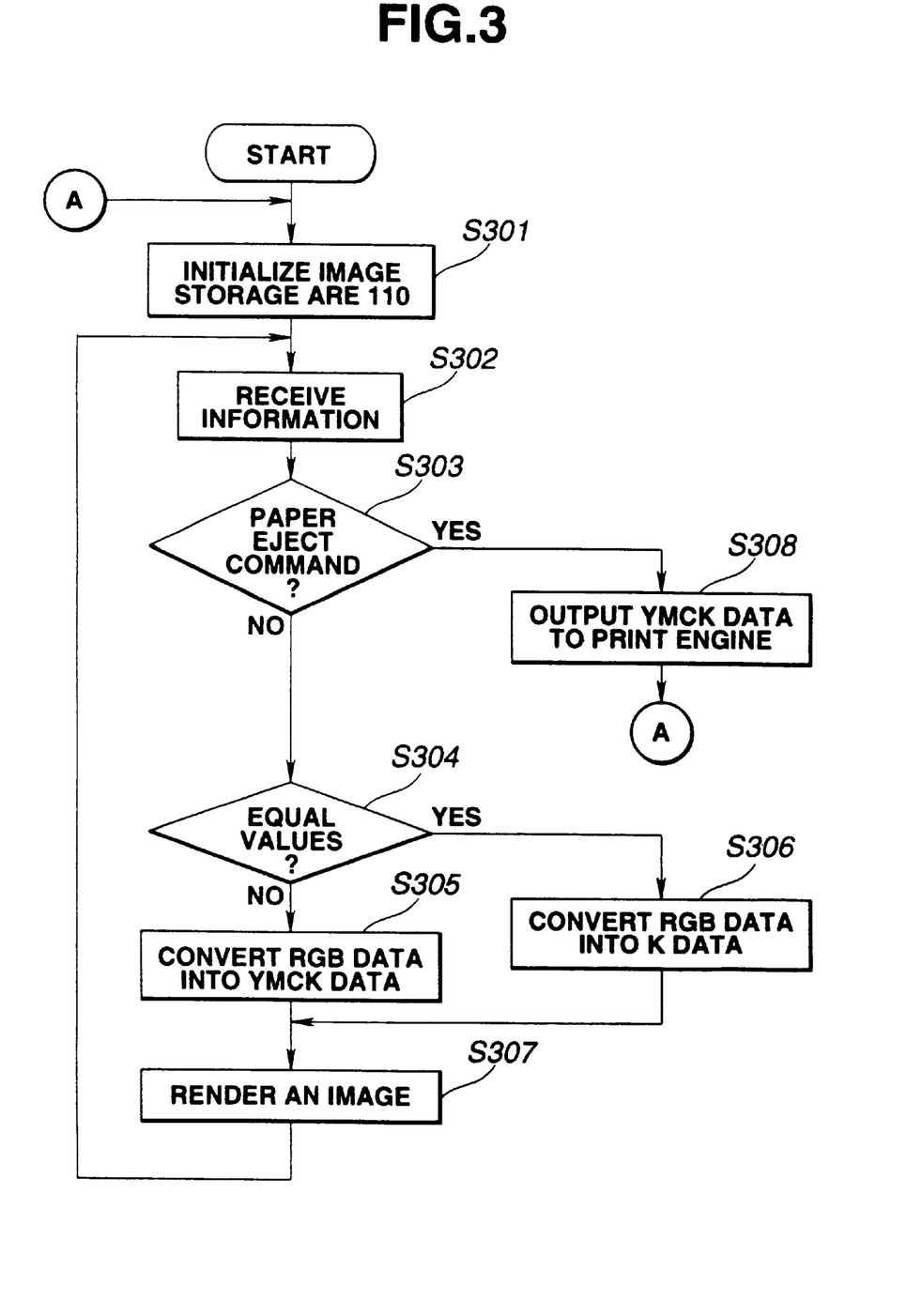
FIG. 3 is a flow chart showing the flow of color conversion control processing (program), concerning a first embodiment of the invention.

FIG. 3 is a flow chart showing the flow of color conversion control processing in color laser beam printer unit 100, concerning the first embodiment. The process steps shown in FIG. 3 are stored program process steps such as computer code that are stored in a computer readable memory medium, in this case in program ROM 104, as explained below in connection with FIG. 5. The first embodiment will be described below with reference to FIG. 3 indicating the color conversion control program.

In step S301, in response to initial application of power, CPU 103 initializes image storage area 110. In step S302, CPU 103 reads received information in single unit codes from reception buffer 102 which stores commands and data received from host computer 101. In step S303, CPU 103 determines if the read information is a paper eject command. If it is determined in step S303 that the read information is not a paper eject command, or some other command, CPU 103 determines that the read information is data and thereupon in step S304 determines if the read data for each of the R (red), G (green) and B (blue) colors all have equal values (i.e., if R=G=B).

If it is determined in step S304 that the read data for R, G and B colors do not all have equal values (e.g., R≠G or R≠B or G≠B), CPU 103 converts the read data (RGB data) into YMCK data as the color space of the color printer engine using the color converting program 109 in step S305.

The color convert process to convert the RGB data (Red, Green and Blue data) to YMCK data is executed using the 4×3 matrix as follows:

$$\begin{bmatrix} Y \\ M \\ C \\ K \end{bmatrix} = [4 \times 3 \text{ matrix}] \begin{bmatrix} R \\ G \\ B \end{bmatrix}$$

If it is determined in step S304 that the read data for R, G and B colors have all equal values (R=G=B), CPU 103 sets values for Y, M and C data identically to 0 (Y=M=C=0) and converts the read data (R, G and B data) into K data only in step S306. A good formula for conversion is as follows:

K=1−(0.289658R+0.605636G+0.104665B)

At this point, R (Red), G (Green) and B (Blue) data is luminance signal from 0 to 1 and K (blacK) data is a density signal from 0 to 1.

In step S307, CPU 103 renders an image based on data converted in step S305 and S306 using rendering program 108, stores the image by color in image storage area 110 and flow returns to step S302 to receive new information.

On the other hand, if it is determined in step S303 that read information is a paper eject command, CPU 103 outputs the YMCK image in image storage area 110 to print engine interface 105 to a color laser beam printer engine to print the YMCK image. The color laser beam printer engine prints YMCK image using Y (Yellow), M (Magenta), C (Cyan) and K (blacK) color toner.

As described above, when CPU 103 determines that the read data for R, G and B colors have equal values, CPU 103 sets values for Y, M and C data to 0 (zero) and converts the received RGB data into K data only.

Therefore, when a host computer 101 outputs R, G and B data having equal values (R=G=B) to color laser beam printer control unit 100 in expectation of a black color, black color as expressed by K data only is printed. As a result, the user gets the black color which the user expected.

Further, the step S304 to check values of R, G and B data can be selectively executed based on a type of read data (character, figures, image and the like).

Second Embodiment

Figure 4:
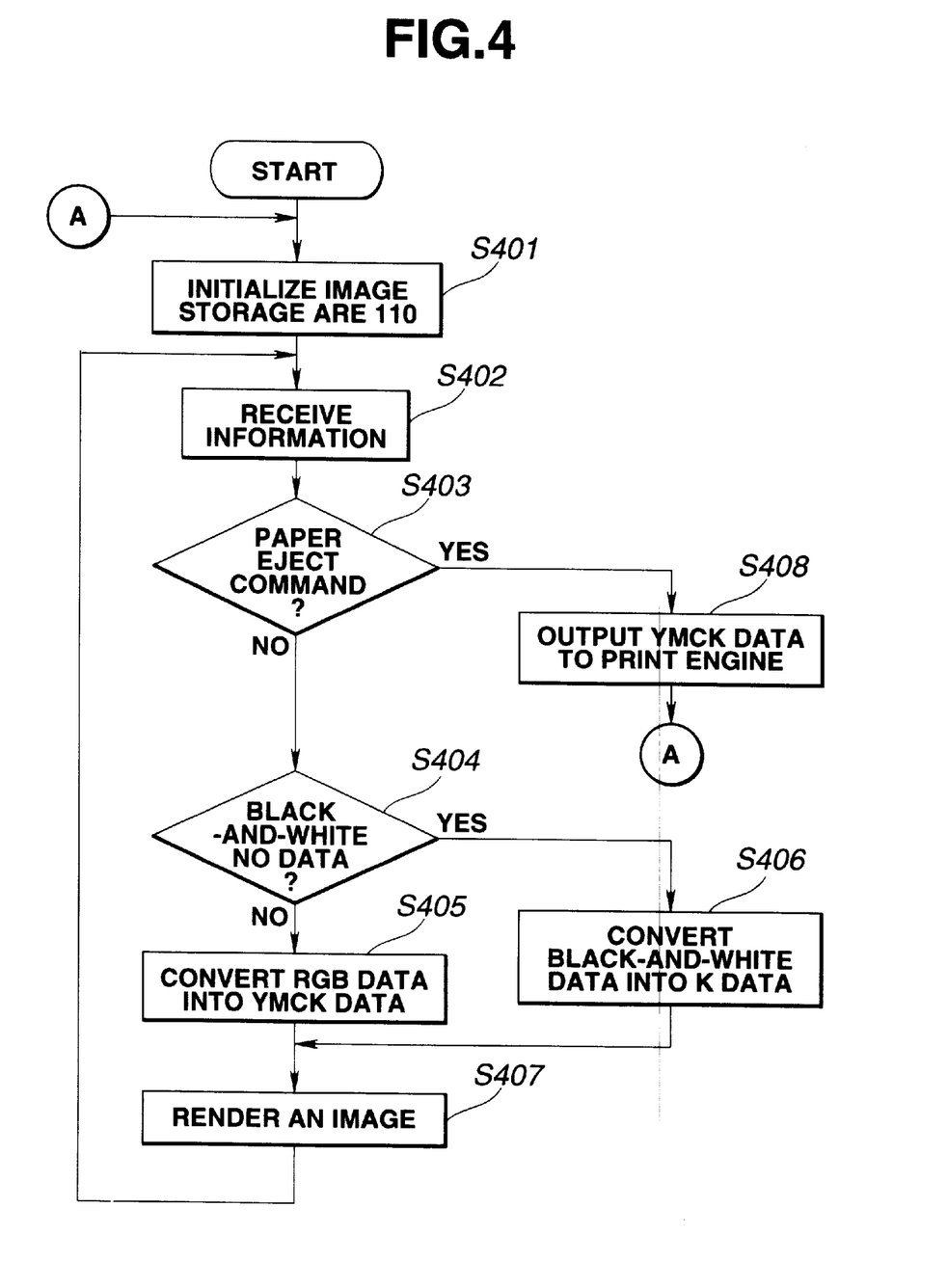
FIG. 4 is a flow chart showing the flow of color conversion control processing (program), concerning a second embodiments.

FIG. 4 is a flow chart showing the flow of color conversion control processing in color laser beam printer control unit 100, concerning the second embodiment. The process steps shown in FIG. 4 are stored program process steps such as computer code that are stored in a computer readable memory medium, in this case in program ROM 104, as explained below in connection with FIG. 5. The second embodiment will be described below with reference to FIG. 4 indicating the color conversion control program.

In step S401, in response to initial application of power, CPU 103 initializes image storage area 110. In step S402, CPU 103 reads received information in single unit codes from reception buffer 102 which stores commands and data received from host computer 101. In step S403, CPU 103 determines if the read information is a paper eject command. If it is determined in step S403 that the read information is not a paper eject command, or some other command, CPU 103 determines that the read information is data and in step S404 checks if the read data is black-and-white data.

If it is determined in step S404 that the read data is not black-and-white data, CPU 103 converts the read data (RGB data) into YMCK data as the color space of the color printer engine using the color converting program 109 in step S405.

The color conversion process to convert RGB data to YMCK data, is executed using the 4×3 matrix as follows:

$$\begin{bmatrix} Y \\ M \\ C \\ K \end{bmatrix} = [4 \times 3 \text{ matrix}] \begin{bmatrix} R \\ G \\ B \end{bmatrix}$$

If it is determined in step 404 that the read data is black-and-white data, CPU 103 converts the read data (the black-and-white data) into K data only. The converted black-and-white data (intermediate object data of K data only) is stored in work area in RAM 101.

In step S407, CPU 103 renders an image based on the converted data in work area using rendering program 108, stores the image by color in image storage area 110 and flow returns to step S402 to receive new information.

In step S407, when CPU 103 renders the image, CPU 103 sets values for Y, M and C data to 0 (zero). On the other hand, if it is determined in step S403 that read information is a paper eject command, CPU 103 outputs the rendered YMCK image in image storage area 110 to print engine interface 105 of a color laser beam printer engine to print the YMCK image. The color laser beam printer engine prints YMCK image using Y (Yellow), M (Magenta), C (Cyan) and K (blacK) color toner.

As described above, when CPU 103 determines that the read data is black-and-white data, CPU 103 converts the read data into K data only. And then, when CPU 103 renders an image in step S407, CPU 103 sets values for Y, M and C data to 0. As a result, it can be prevented that the size of the converted black-and-white image data in work area 101 (intermediate object data) is four times as large as needed.

The present invention can be applied to a system constituted by a plurality of devices or to an apparatus comprising a single device.

Further, the object of the present invention can also be achieved by providing a storage medium storing program codes for performing the aforesaid process to a system or an apparatus rendering the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Figure 5:
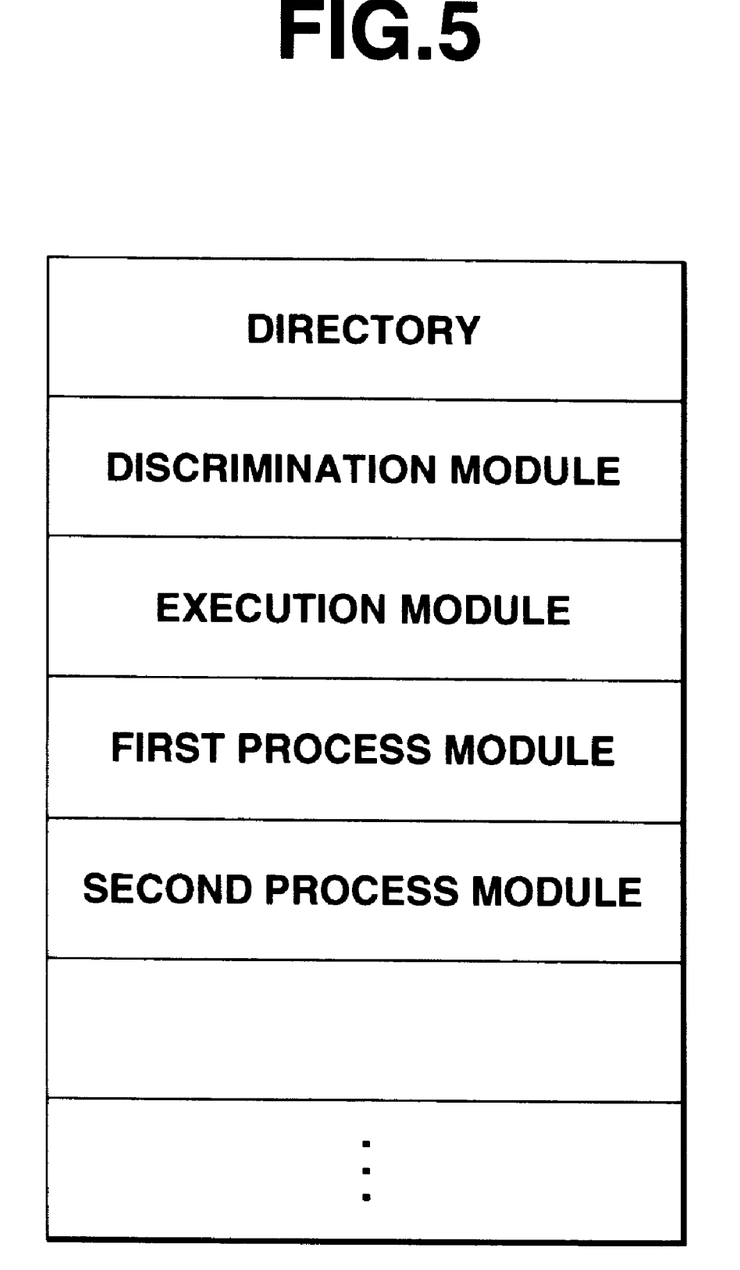
FIG. 5 depicts a memory map of a memory medium storing code for color conversion control processing (program), concerning the first and second embodiments.

FIG. 5 depicts a memory map of a memory medium such as program ROM 104 storing the color conversion control program concerning the above embodiments.

The memory medium stores program codes to execute, based on a discriminated type of received data, a first process to convert the received data into Y, M, C and K data or a second process to convert the received data into K data. The program codes are used in a color data processing apparatus such as a color printer controller in a color printer. The memory medium stores program codes of a discrimination module and an execution module at least as is shown in FIG. 5.

The discrimination module is program code to discriminate a type of received data.

The execution module is program code to execute, based on a discriminated type of the received data, a first process to convert the received data into Y, M, C and K data or a second process to convert the received data into K data.

Further, a detachable storage medium for a color laser beam printer, such as a floppy disk, an optical disk, a magneto-optical disk, CD-ROM, CD-R, a magnetic tape and a non-volatile type of memory card, can be used for providing the storage medium.

According to a color data processing apparatus of the present invention, the color data processing apparatus discriminates a type of received data (in step S304 or S404) and executes based on the discriminated type of received data, a first process (in step S305 or S405) to convert the received data into Y, M, C and K data or a second process (in step S306 or S406) to convert the received data, in K data. For example, when the received data is color data for R, G and B colors, and the color data for the R, G and B colors all have equal values, CPU 103 executes the second process (in step S306) to render an image (in step S307) based on data converted by the second process. As a result, a user can get black color which the user expected.

Also, for example, when the received data is color data for R, G and B colors, and the color data for R,G and B colors do not all have equal values, CPU 103 executes the first process (in step S305) to render an image (in step S307) based on data converted by the first process.

Also, for example, when the received data is black-and-white data, CPU 103 executes the second process (in step S406) to render an image (in step S407) based on data converted by the second process.

Also, for example, when the received data is not black-and-white data, CPU 103 executes the first process (in step S405) to render an image (in step S407) based on data converted by the first process.

Also, for example, when CPU 103 renders an image (in step S407) based on data converted by the second process, CPU 103 sets values for Y, M and C data to 0. As a result, it can be prevented that the size of the converted black-and-white data (intermediate object data) becomes four times as large as needed.

Although the present embodiment is described in reference to a color laser beam printer, the present invention may also be used in ink jet printers, bubble jet printers, thermal printers, and so on.

The present invention is not limited to the above embodiments and various changes and modifications can be made within the spirit and scope of the present invention. Therefore, to apprise the public of the scope of the present invention, the following claims are made.

What is claimed is:

1. A color data processing apparatus comprising:
   discriminating means for discriminating color information;
   analyzing means for analyzing a type of an object of the color information;
   executing means for executing, by an object, a first process for converting the color information into Y(yellow), M(magenta, C(cyan) and K(black) intermediate data, or a second process for converting the color information into K intermediate data, in accordance with a result of discriminating by said discriminating means;
   control means for prohibiting to execute said second process in accordance with a result of analyzing by said analyzing means; and
   rendering means for rendering an image by color based on intermediate data converted by said first process or said second process, and storing the rendered image by color.

2. The apparatus according to claim 1, wherein when the color information is color data for R (red), G (green) and B (blue) colors, said discriminating means discriminates whether the color data for R, G and B colors have equal values, and wherein said executing means executes the second process to render an image based on data converted by the second process in a case where said discriminating means discriminates that the color data for R, G and B colors have equal values.

3. The apparatus according to claim 1, wherein when the color information is color data for R, G and B colors, said discriminating means discriminates whether the color data for the R, G and B colors do not have equal values, and wherein said executing means executes the first process to render an image based on data converted by the first process in a case where said discriminating means discriminates that the color data for R, G and B colors do not have equal values.

4. The apparatus according to claim 1, wherein said discriminating means discriminates whether the color information is black-and-white data, and wherein said executing means executes the second process to render an image based on data converted by the second process.

5. The apparatus according to claim 4, wherein when said executing means renders an image based on data converted by the second process, said executing means sets values for Y, M and C data to 0.

6. The apparatus according to claim 1, wherein said discriminating means discriminates whether the color information is black-and-white data, and wherein said executing means executes the first process to render an image based on data converted by the first process in a case where said discriminating means discriminates that the color information is not black-and-white data.

7. The apparatus according to claim 1, further comprising a reception buffer for storing commands and color information received from a host computer, wherein said discriminating means reads the received color information in unit codes from said reception buffer to discriminate a type of received color information.

8. The apparatus to claim 1, further comprising printing means for printing the converted data using Y (Yellow), M (Magenta), C (Cyan) and K (black) color.

9. A control method for a color data processing apparatus, said method comprising:
   a discriminating step of discriminating color information;
   an analyzing step of analyzing a type of an object of the color information;
   an executing step of executing, by an object, a first process of converting the color information into Y(yellow), M(magenta), C(cyan) and K(black) intermediate data, or a second process of converting the color information into K intermediate data in accordance with a result of discriminating by said discriminating step;
   a controlling step of prohibiting to execute said second process in accordance with a result of analyzing by said analyzing step; and
   a rendering step of rendering an image by color based on intermediate data converted by said first process or said second process, and storing the rendered image by color.

10. The method according to claim 9, wherein when the color information is color data for R (red), G (green) and B (blue) colors, and the color data for R, G and B colors have equal values, the execution step executes the second process to render an image based on data converted by the second process.

11. The method according to claim 9, wherein when the color information is color data for R, G and B colors, and the color data for the R, G and B colors do not have equal values, the execution step executes the first process to render an image based on data converted by the first process.

12. The method according to claim 9, wherein when the color information is black-and-white data, the execution step executes the second process to render an image based on data converted by the second process.

13. The method according to claim 9, wherein when the color information is not black-and-white data, the execution step executes the first process to render an image based on data converted by the first process.

14. The method according to claim 12, wherein when the execution step renders an image based on data converted by the second process, the execution step sets values for Y, M and C data to 0.

15. The method according to claim 9, wherein the discrimination step reads the color information as meaningful one unit codes from a reception buffer which stored command and color information from a host computer to discriminate the color information.

16. A memory medium storing a control program for a color data processing apparatus, comprising:
   code for a discriminating step of discriminating color information;
   code for an analyzing step of analyzing a type of an object of the color information;
   code for an executing step of executing, by an object, a first process of converting the color information into Y(yellow), M(magenta), C(cyan) and K(black) intermediate data, or a second process of converting the color information into K intermediate to data, in accordance with a result of discriminating by said code for a discriminating step;
   code for a controlling step of prohibiting to execute said second process in accordance with a result of analyzing by said analyzing step; and
   code for a rendering step of rendering an image by color based on intermediate data converted buy said first process or said second process, and storing the rendered image by color.

17. The memory medium according to claim 16, wherein when the color information is color data for R (red), G (green) and B (blue) colors, and the color data for R, G and B colors have equal values, the code for an execution step executes the second process to render an image based on data converted by the second process.

18. The memory medium according to claim 16, wherein when the color information is color data for R, G and B colors, and the color data for the R, G and B colors do not have equal values, the code for an execution step executes the first process to render an image based on data converted by the first process.

19. The memory medium according to claim 16, wherein when the color information is black-and-white data, the code for an execution step executes the second process to render an image based on data converted by the second process.

20. The memory medium according to claim 16, wherein when the color information is not black-and-white data, the code for an execution step executes the first process to render an image based on data converted by the first process.

21. The memory medium according to claim 19, wherein when the code for an executing step renders an image based on data converted by the second process, the code for an execution step sets values for Y, M and C data to 0.

22. The memory medium according to claim 16, wherein the code for a discrimination step reads the color information as meaningful one unit codes from a reception buffer which stored command and data received from a host computer to discriminate a type of color information.

23. A program stored in a memory medium in a color data processing apparatus, comprising:
   code for a discriminating step of discriminating color information;
   code for an analyzing step of analyzing a type of an object of the color information;
   code for an executing step of executing, by an object, a first process of converting the color information into Y(yellow) M(magenta) C(cyan) and K(black) intermediate data, or a second process of converting the color information into K intermediate data, in accordance with a result of discriminating by said code for a discriminating step;
   code for a controlling step of prohibiting to execute said second process in accordance with a result of analyzing by said analyzing step;
   code for a rendering step of rendering an image by color based on intermediate data converted by said first process or said second process, and storing the rendered image by color.

24. The program according to claim 23, wherein when the color information is color data for R (red), G (green) and B (blue) colors, and the color data for R, G and B colors have equal values, the code for an execution step executes the second process to render an image based on data converted by the second process.

25. The program according to claim 23, wherein when the color information is color data for R, G and B colors, and the color data for the R, G and B colors do not have equal values, the code for an execution step executes the first process to render an image based on data converted by the first process.

26. The program according to claim 23, wherein when the color information is black-and-white data, the code for an execution step executes the second process to render an image based on data converted by the second process.

27. The program according to claim 23, wherein when the color information is not black-and-white data, the code for an execution step executes the first process to render an image based on data converted by the first process.

28. The program according to claim 26, wherein when the code for an executing step renders an image based on data converted by the second process, the code for an execution step sets values for Y, M and C data to 0.

29. The program according to claim 23, wherein the code for a discrimination step reads the color information as meaningful one unit codes from a reception buffer which stored command and data received from a host computer to discriminate a type of color information.

30. A color data processing apparatus, comprising:
   a processor for analyzing a type of an object of color information from a host computer;
   executing means for executing, by an object, a first process for converting the color information into Y(yellow), M(magenta), C(cyan) and K(black) intermediate data, or a second process for converting the color information into K intermediate data;
   said processor including:
      control means for prohibiting to execute said second process in accordance with a result of analyzing by said processor: and
      rendering means for rendering an image by color based on intermediate data converted by said first process or said second process, and storing the rendered image by color.

31. The apparatus according to claim 30, wherein when the color information is color data for R (red), G (green) and B (blue) colors, and the color data for R, G and B colors have equal values, the processor executes the second process to render an image based on data converted by the second process.

32. The apparatus according to claim 30, wherein when the color information is color data for R, G and B colors, and the color data for the R, G and B colors do not have equal values, the processor executes the first process to render an image based on data converted by the first process.

33. The apparatus according to claim 30, wherein when the color information is black-and-white data, the processor executes the second process to render an image based on data converted by the second process.

34. The apparatus according to claim 30, wherein when the color information is not black-and-white data, the processor executes the first process to render an image based on data converted by the first process.

35. The apparatus according to claim 33, wherein when the processor renders an image based on data converted by the second process, the processor sets values for Y, M and C data to 0.

36. A color data processing system comprising:
   a host computer for transmitting color information to a color data processing apparatus,
   a color data processing apparatus having a processor for analyzing a type of an object of the color information from the host computer,
   executing means for executing, by an object, a first process for converting the color information into Y(yellow), M(magenta), C(cyan) and K(black) intermediate data, or a second process for converting the color information into K intermediate data;
   control means for prohibiting to execute said second process in accordance with a result of analyzing by said processor; and
   rendering means for rendering an image by color based on intermediate data converted by said first process or said second process, and storing the rendered image by color.

37. The system according to claim 36, wherein when the color information is color data for R (red), G (green) and B (blue) colors, and the color data for R, G and B colors have equal values, the processor executes the second process to render an image based on data converted by the second process.

38. The system according to claim 36, wherein when the color information is color data for R, G and B colors, and the color data for the R, G and B colors do not have equal values, the processor executes the first process to render an image based on data converted by the first process.

39. The system according to claim 36, wherein when the color information is black-and-white data, the processor executes the second process to render an image based on data converted by the second process.

40. The system according to claim 36, wherein when the color information is not black-and-white data, the processor executes the first process to render an image based on data converted by the first process.

41. The system according to claim 39, wherein when the processor renders an image based on data converted by the second process, the processor sets values for Y, M and C data to 0.

42. The system according to claim 36, wherein the processor reads the color information as meaningful one unit codes from a reception buffer which stored command and data received from the host computer to discriminate the received color information.

43. The system according to claim 36, further comprising print engine for printing the image using Y (Yellow), M (Magenta), C (Cyan) and K (blacK) color.

* * * * *

UNITED STATES PATENT AND TRADEMARK OFFICE
CERTIFICATE OF CORRECTION

PATENT NO.    : 6,348,977 B1
DATED         : February 19, 2002
INVENTOR(S)   : Jouji Ooki It is certified that error appears in the above-identified patent and that said Letters Patent is hereby corrected as shown below:

<u>Drawings,</u>
SHEET 2, FIG. 2, "ARE 110" should read -- AREA 110 --.
SHEET 3, FIG. 3, "ARE 110" should read -- AREA 110 --.
SHEET 4, FIG. 4, "ARE 110" should read -- AREA 110 --.

<u>Column 1,</u>
Line 45, "convert" should read -- conversion --.

<u>Column 2,</u>
Line 14, "ares 110" should read -- area 110 --; and
Line 49, "an" should read -- a --.

<u>Column 3,</u>
Line 5, "in" should read -- on --; and
Line 25, "embodiments." should read -- embodiment. --.

<u>Column 5,</u>
Line 8, "step 404" should read -- step S404 --.

<u>Column 6,</u>
Line 10, "in" should read -- into --; and
Line 53, "M(magenta," should read -- M(magenta), --.

<u>Column 7,</u>
Line 39, "to" should read -- according to --.

<u>Column 8,</u>
Line 20, "stored" should read -- has stored --;
Line 33, "to" should be deleted; and
Line 41, "buy" should read -- by --.

UNITED STATES PATENT AND TRADEMARK OFFICE
CERTIFICATE OF CORRECTION

PATENT NO.    : 6,348,977 B1
DATED         : February 19, 2002
INVENTOR(S)   : Jouji Ooki It is certified that error appears in the above-identified patent and that said Letters Patent is hereby corrected as shown below:

Column 9,
Line 4, "stored" should read -- has stored --;
Line 14, "Y(yellow) M(magenta) C(cyan)" should read -- Y(yellow), M(magenta), C(Cyan) --;
Line 21, "step;" should read -- step; and --; and
Line 53, "stored" should read -- has stored --.

Column 11,
Line 3, "stored" should read -- has stored --.

Signed and Sealed this

Ninth Day of July, 2002

Attest:

*Attesting Officer*

JAMES E. ROGAN
*Director of the United States Patent and Trademark Office*